United States Patent
Willey et al.

(10) Patent No.: US 10,545,895 B1
(45) Date of Patent: Jan. 28, 2020

(54) AUTO-ZEROING RECEIVER FOR MEMORY INTERFACE DEVICES

(71) Applicant: Cadence Design Systems, Inc., San Jose, CA (US)

(72) Inventors: Aaron Willey, Hayward, CA (US); Hari Anand Ravi, Bangalore (IN); H. Md. Shuaeb Fazeel, Bangalore (IN); Thomas Evan Wilson, Laurel, MD (US); Moo Sung Chae, Cary, NC (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 94 days.

(21) Appl. No.: 15/876,473

(22) Filed: Jan. 22, 2018

(51) Int. Cl.
G06F 13/28 (2006.01)

(52) U.S. Cl.
CPC ........ G06F 13/287 (2013.01); G06F 2213/28 (2013.01)

(58) Field of Classification Search
CPC ........................... G06F 13/287; G06F 2213/28
See application file for complete search history.

(56) References Cited

U.S. PATENT DOCUMENTS

| | | | |
|---|---|---|---|
| 7,348,824 B2 | 3/2008 | Naviasky et al. | |
| 8,737,491 B1 | 5/2014 | Wilson et al. | |
| 9,542,512 B1 | 1/2017 | Al-Hawari et al. | |
| 9,589,627 B1 | 3/2017 | Wilson et al. | |
| 9,754,646 B1 | 9/2017 | Kumar et al. | |
| 9,767,888 B1 | 9/2017 | Ravi et al. | |
| 9,811,273 B1 | 11/2017 | Brahmadathan | |
| 10,128,965 B1 * | 11/2018 | Wilson ................... | H04B 17/21 |
| 2015/0237274 A1 * | 8/2015 | Yang ..................... | H04N 5/3575 |
| | | | 348/308 |

* cited by examiner

*Primary Examiner* — Nimesh G Patel
(74) *Attorney, Agent, or Firm* — Foley & Lardner LLP

(57) ABSTRACT

Embodiments described herein relate to circuits and techniques for interfacing a microprocessor with memory devices, particularly memory devices such as DDR SDRAM in accordance with protocols such as DDR4 and DDR5. Some embodiments particularly relate to a receiver architecture for a DDR memory interface device that provides AC coupling to memory and includes auto-zeroing functionality. These and other embodiments incorporate equalization functionality such as decision feedback equalization and continuous time linear equalization.

20 Claims, 17 Drawing Sheets

US 10,545,895 B1

AUTO-ZEROING RECEIVER FOR MEMORY INTERFACE DEVICES

TECHNICAL FIELD

The present embodiments relate generally to interface circuits with memory devices (e.g., double data rate (DDR) memory), and more particularly to memory interface receivers for use with such memory devices.

BACKGROUND

A typical computing device is implemented with a microprocessor, memory, and a number of other modules depending on the function to be performed by the computing device. DDR random access memory (RAM) is a particular type of RAM commonly used in current technology that performs two read accesses or two write accesses per clock cycle. Microprocessors and DDR RAM both operate on various different power supply voltages. Interface circuits that can convert between different signal levels and different drive levels are used to allow for compatible communications between microprocessors and memory devices.

As the DRAM sector approaches 6.4 Gbps in current and proposed DDR standard protocols, and while power and area restrictions continue to be imposed on interface circuits, their performance can suffer. A solution to these and other problems is thus desirable.

SUMMARY

Embodiments described herein relate to circuits and techniques for interfacing a microprocessor with memory devices, particularly memory devices such as DDR SDRAM in accordance with protocols such as DDR4 and DDR5. Some embodiments particularly relate to a receiver architecture for a DDR memory interface device that provides AC coupling to memory and includes auto-zeroing functionality. These and other embodiments incorporate equalization functionality such as decision feedback equalization and continuous time linear equalization.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Embodiments described herein relate to circuits and techniques for interfacing a microprocessor with memory devices, particularly memory devices such as DDR SDRAM in accordance with protocols such as DDR4 and DDR5. Some embodiments particularly relate to a receiver architecture for a DDR memory interface device that provides AC coupling to memory and includes auto-zeroing functionality. These and other embodiments incorporate equalization functionality such as decision feedback equalization and continuous time linear equalization.

Figure 1:
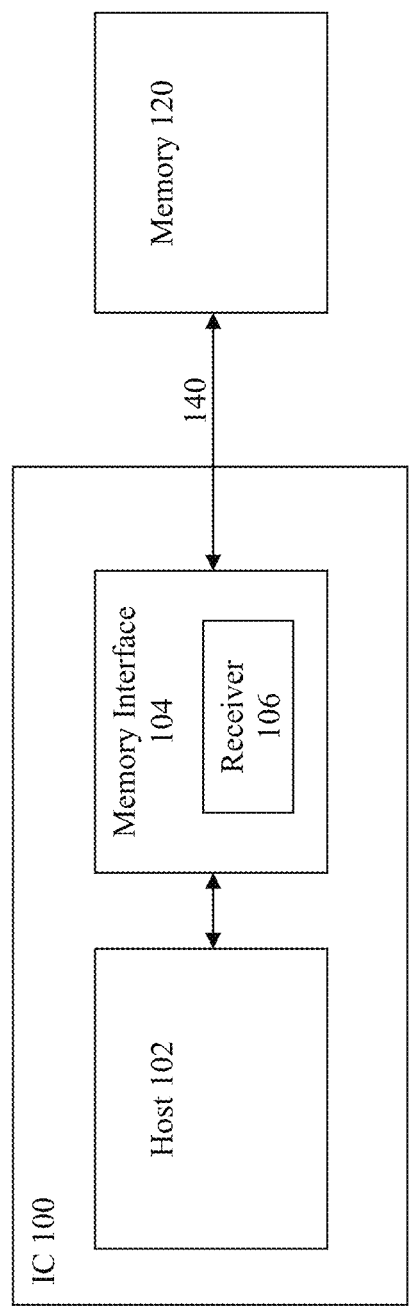
FIG. 1 is a block diagram of an example system in which the present embodiments may find useful application.

FIG. 1 illustrates an example interface between an integrated circuit (IC) 100 and a memory module 120, in accordance with some embodiments described herein. The memory module 120 is a dynamic random access memory (DRAM) that is connected to the integrated circuit by a bus 140, which can include an address bus, a data bus, read-write (R/W) signals, and a chip-enable (CE) signal as is known to those skilled in the art. IC 100 is an application specific integrated circuit (ASIC) or a system on a chip (SoC). Host 102 is a microprocessor such as a CPU, DSP or processor core. Memory module 120 may be controlled on a system clock and can therefore be referred to as SDRAM. Embodiments of IC 100 can include additional components than shown in FIG. 1, however illustration thereof is omitted herein for sake of clarity.

Single data rate (SDR) SDRAM was originally built to execute one memory read access or one write access per clock cycle. On each clock cycle, an n-bit word may be transferred to or from the memory. The word length is, in some embodiments, configured in multiples of eight, and in more recent computer machines, it is common to transfer 64-bit words per clock cycle. DDR SDRAM was implemented as an improvement over SDR SDRAM and is capable of performing two read accesses or two write accesses per clock cycle. This was accomplished by performing one access on the rising edge of the clock and one access on the falling edge of the clock. In this manner, the data transfer rate is doubled by transferring two 64-bit words per clock cycle. The standard protocols for operating DDR SDRAM are defined by JEDEC, with the most recent standards including DDR4 and DDR5 (currently in development).

The operation of host 102 involves the execution of programs that are loaded into the memory module 120 so as to create, edit, and delete data that is also stored in the memory module 120 or other devices. Specifically, each microprocessor operation involves a fetch and execute cycle where an instruction is read from the memory module 120, decoded by the host 102, and executed. Also, the execution of the instruction often involves a data read or a data write to the memory module 120. Each of these instruction cycles is performed synchronously to a system clock, with the duration of the instruction cycle lasting between one and three clock cycles.

More particularly, during a read operation, the host 102 indicates the address location from which data from the memory module 120 is to be read. Memory interface 104 is responsible for indicating the address on the address bus, floating the data bus (high Z or high impedance state), and asserting the CE and R/W signals for a read operation. Then the memory module 120 places the data from the memory location indicated by the address bus onto the data bus. The memory interface 104 then reads the data from the data bus. More particularly, receiver 106 converts the data signals from the memory module 120 to the voltage levels needed by host 102, and the read operation is complete. In this regard, memory types such as DDR4 typically operate between a VDDQ=1.32 Volt supply voltage down to a VDDQ=1.08 Volt supply voltage, while current microprocessor cores operate with a power supply voltage as low as VDD=0.65 Volts. The microprocessor supply voltage, core supply voltage, or signal supply voltage will be referred to herein as VDD while the memory supply voltage or I/O supply voltage will be referred to as VDDQ.

DDR interface receivers such as receiver 106 are commonly DC coupled to external signaling for communicating with memory module 120. This is in part due to power constraints as well as design complexity. However, the present applicant recognizes that current state-of-the-art DRAM protocols have increasingly challenged receiver designs with higher bandwidth requirements, low power needs, wide input common mode range and introduction of channel equalization techniques. Among other things, the present applicant recognizes that DC coupled receiver architectures typically have less than desirable power and or performance tradeoffs which may negatively affect system designs.

Accordingly, among other things, the present embodiments provide an AC coupled receiver architecture. This AC coupled differential receiver architecture can operate over a full input common mode range (i.e. from GND to VDDQ) and can amplify input signals at speeds up to or exceeding 6.4 Gbps. Additionally, the receiver architecture of the present embodiments includes an auto-zeroing functionality (i.e. the receiver is a differential auto-zeroing receiver (DAZR)). Among other things, this auto-zeroing functionality aims to null out any input referred mismatch in the differential amplifiers. More particularly, the present applicant recognizes that due to strict area, bandwidth and power requirements of DDR receivers, a non-trivial amount of input referred mismatch is present. This mismatch should be zeroed out through some form of calibration to achieve an acceptable setup/hold margin during read operations.

Figure 2:
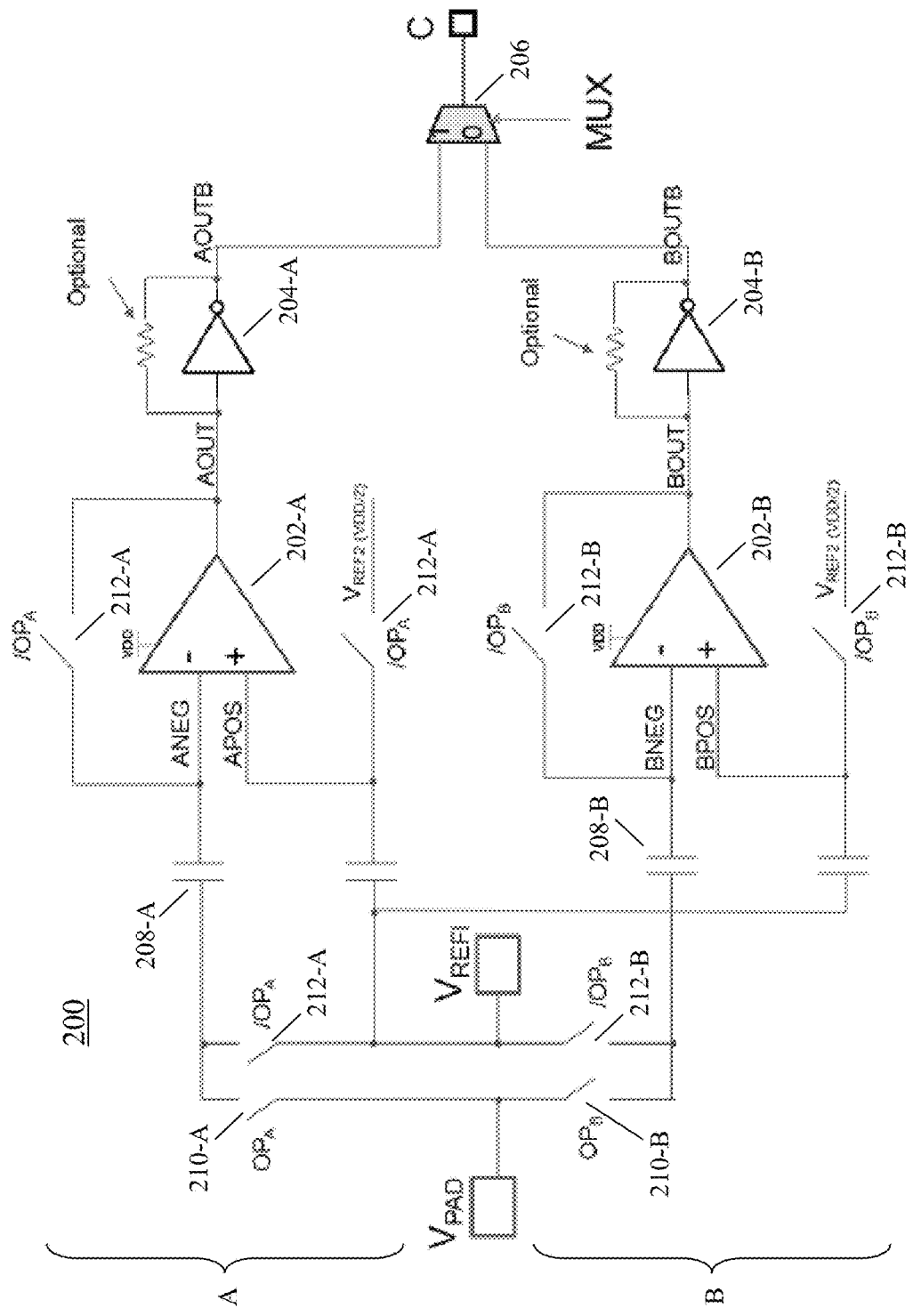
FIG. 2 is a block diagram illustrating an example receiver according to embodiments.

FIG. 2 is a block diagram illustrating an example architecture for receiver 200 according to embodiments. It should be noted that this architecture illustrated for receiving one bit of data from memory can be replicated based on the word size used in a particular application. Those skilled in the art of memory interfaces will understand how to adapt a receiver for a memory interface circuit (i.e. memory controller and/or PHY) with the DAZR functionality of the present embodiments after being taught by the following examples. It should be noted that the receiver architecture of the present embodiments is not necessarily limited to a memory interface circuit on a separate chip or die from a memory chip or die. For example, the receiver architecture could be placed on a memory die and be connected to a memory controller PHY.

Receiver 200 in this example includes input pins VPAD and VREF1 and an output pin C. In general, receiver 200 provides an amplified output at pin C based on the data provided from DDR memory at input pin VPAD (i.e. one bit of data). VREF1 is a reference voltage that is used for detecting whether the VPAD signal is a logic "1" or a "0" and effectively represents the input common mode level of the circuit. In one example embodiment, the reference voltage is generated on the integrated circuit and is configurable.

According to certain AC coupling and "hot swap" operational aspects to be described in further detail below, receiver 200 according to embodiments includes duplicate receiver paths A and B. More particularly, as shown, example receiver 200 includes identical differential amplifiers 202-A and 202-B in paths A and B, respectively. Amplifier 202-A receives ANEG at an inverting input and APOS and a non-inverting input and outputs AOUT. Amplifier 202-B receives BNEG at an inverting input and BPOS at a non-inverting input and outputs BOUT.

As can be seen, the signal from the VPAD input pin (i.e. one bit of data from DDR memory) can be selectively provided via input capacitors 208-A and 208-B to either or both of the ANEG and BNEG inputs of amplifiers 202-A and 202-B, respectively, by operation of switches 210-A and 210-B controlled by signals OPA and OPB, respectively.

Switches 212-A and 212-B, controlled by signals /OPA and /OPB, respectively, are used to control an auto-zeroing operation for amplifiers 202-A and 202-B, respectively, as will be described more fully below. At the least, however, it should be noted that when switches 212-A and 212-B are closed, the APOS and BPOS input terminals for amplifiers 202-A and 202-B are respectively coupled in parallel to VREF1 and VREF2. It should be further apparent that signals /OPA and /OPB are complementary signals of OPA and OPB, respectively.

Inverter 204-A inverts AOUT from amplifier 202-A to AOUTB. Inverter 204-B inverts BOUT from amplifier 202-B to BOUTB. Mux 206 selects one of AOUTB or BOUTB for output to pin C based on input selection signal MUX. In one possible example, when the MUX signal is "high" or logic "1," Mux 206 selects AOUTB for output to output pin C, and when the MUX signal is "low" or logic "0," Mux 206 selects BOUTB for output to output pin C.

Reference voltage VREF2 is coupled to a voltage divider that divides VDD in half in an example open-loop configuration of receiver 200.

Figure 3:
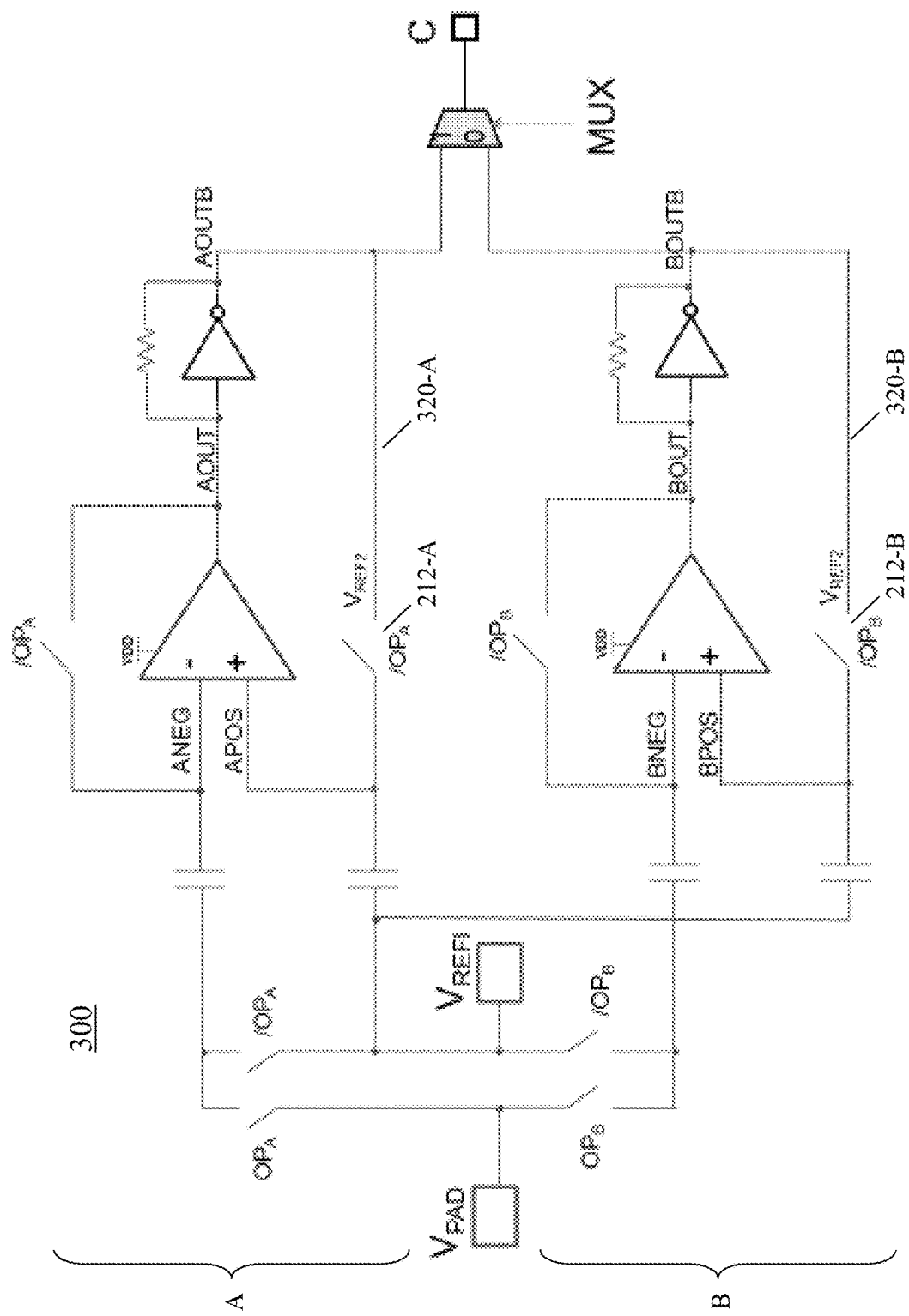
FIG. 3 is a block diagram illustrating another example receiver according to embodiments.

FIG. 3 is a block diagram illustrating an example receiver 300 according to alternative embodiments. Similar to receiver 200 in FIG. 2, receiver 300 is a DAZR with two duplicate receiver paths A and B. As such, it includes all of the same components such as those described above in connection with FIG. 2.

Different from the open-loop configuration of receiver 200, receiver 300 includes primary and secondary closed loop auto-zeroing paths 320-A and 320-B for causing VREF2 to be provided from output nodes AOUTB and BOUTB, respectively, and controlled by switches 212-A and 212-B, respectively.

Figure 4:
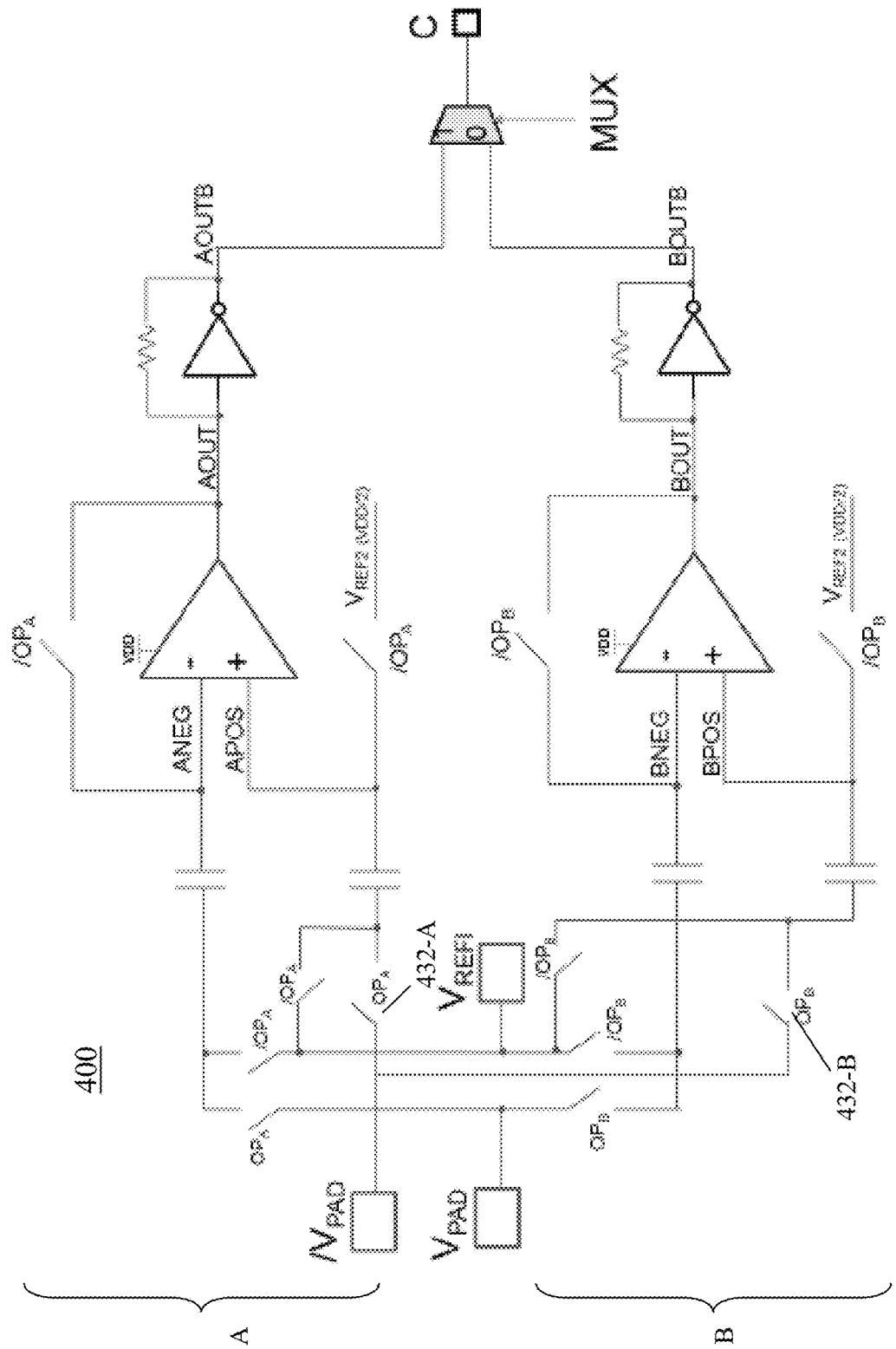
FIG. 4 is a block diagram illustrating another example receiver according to embodiments.

FIG. 4 is a block diagram illustrating an example receiver 400 according to alternative embodiments. Differently from receiver 200 in FIG. 2, and receiver 300 in FIG. 3, receiver 400 is a DAZR with differential input signaling. Accordingly, rather than including only a single input, receiver 400 includes differential inputs VPAD and /VPAD.

In this example, receiver 400 includes all of the same components such as those described above in connection with FIG. 2, including the duplicate receiver paths A and B. However, receiver 400 further includes new switches 432-A and 432-B that are controlled by signals OPA and OPB, respectively. As can be seen, these switches controllably provide the differential signal from /VPAD to either or both of input terminals APOS and BPOS of amplifiers 202-A and 202-B, respectively, at the same time that the signal from VPAD is provided to either or both of input terminals ANEG and BNEG, respectively.

It should be noted that the receivers 200, 300 and 400 are not necessarily exclusive, and that a single receiver can be configured to components of some or any combination of receivers 200, 300 and 400. For example, and without limitation, a single receiver can be configured in one mode of operation to include only a single ended input as in receiver 200 and in another mode of operation to include differential input signaling as in receiver 400.

Figure 5:
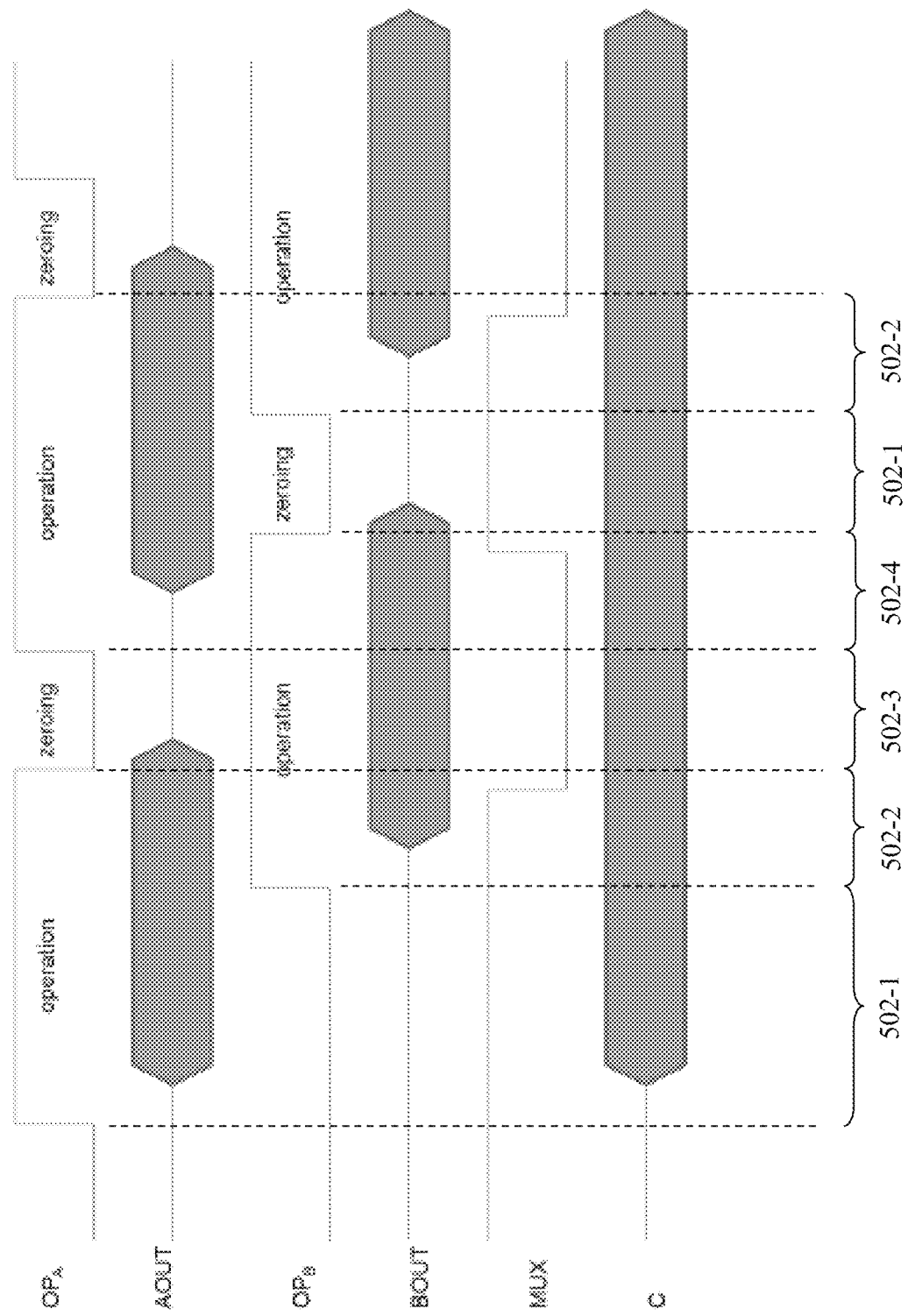
FIG. 5 is a timing diagram illustrating an example operating sequence of a receiver according to embodiments.

FIG. 5 is an example sequence diagram illustrating operational aspects of DAZR receivers 200, 300 and 400 shown in FIGS. 2, 3 and 4, respectively, according to embodiments. Accordingly, although the sequence shown in the example of FIG. 5 will be described with reference to the example receiver 200 shown in FIG. 2, those skilled in the art will understand how the sequence can also be performed using the other example receivers 300 and 400 shown in FIGS. 3 and 4 after being taught by this example. Moreover, those skilled in the art will understand how to incorporate the example sequence shown in FIG. 5 in a DDR memory read function performed by a memory interface device.

In this example, a DAZR receiver according to embodiments includes four modes of operation which sequentially occur for reading a single bit from memory. It should be noted that both receiver paths A and B have been auto-zeroed before the steps described below.

In operating mode 502-1, receiver path A is in read operation while receiver path B is auto-zeroing. In the example of FIG. 5, this includes driving signal OPA high, signal OPB low, and driving the MUX signal high in this mode of operation. More particularly, with reference to example receiver 200 shown in FIG. 2, this causes switches 210-A to close, which causes the signal at input pin VPAD to be provided to the ANEG input of amplifier 202-A, while the signal at input pin VREF1 is provided to the APOS input of amplifier 202-A. In response, amplifier 202-A outputs signal AOUT, which is an amplified and inverted version of the signal at VPAD (whose logic level may be either high or low). To correct the inversion performed by amplifier 202-A (by virtue of the signal at VPAD being provided to the negative input terminal of amplifier 202-A), the AOUT signal from amplifier 202-A is inverted by inverter 204-A and provided as signal AOUTB. This signal AOUTB is selected for output to output pin C by virtue of the MUX signal being high.

Meanwhile, in conjunction with signal OPB being driven low, its complementary signal /OPB is driven high. This causes switches 212-B around amplifier 202-B to close, thereby auto-zeroing the amplifier 202-B and nulling out any input referred mismatch thereof. More particularly, this causes the charge across the input capacitor (connected between the input signal pin VPAD and the BNEG input to amplifier 202-B) to be zeroed. This is beneficial because the charge across this input capacitor will incur some leakage over time as amplifier 202-B input nodes BNEG and BPOS have a non-infinite impedance to surrounding voltage sources. This also causes a constant input common as seen by each differential amplifier to be maintained. That is to say the input signal at pin VPAD is AC coupled into the BNEG and BPOS nodes to keep the input common mode voltage of signals at BNEG and BPOS constant across any range of levels of input common mode signal VREF1.

In operating mode 502-2, receiver paths A and B are in read operation together. In the example of FIG. 5, this includes driving signal OPB high while keeping signal OPA high as in the previous mode 502-1. With reference to example receiver 200 shown in FIG. 2, this causes switches 210-B to close, which causes the signal at input pin VPAD to be provided to the BNEG input of amplifier 202-B, while the signal at input pin VREF1 is provided to the BPOS input of amplifier 202-B. In response, amplifier 202-B outputs signal BOUT, which is an amplified and inverted version of the signal at VPAD (whose logic level may be either high or low). To correct the inversion performed by amplifier 202-B (by virtue of the signal at VPAD being provided to the negative input terminal of amplifier 202-B), the BOUT signal from amplifier 202-B is inverted by inverter 204-B and provided as signal BOUTB. However, the signal AOUTB continues to be selected for output to output pin C during step 502-2 by virtue of the MUX signal being high.

In operating mode 502-3, receiver path A is auto-zeroing while receiver path B remains in read operation. In the example of FIG. 5, this includes driving signal OPA low while signal OPB remains high, and driving the MUX signal low in this mode of operation. More particularly, with reference to example receiver 200 shown in FIG. 2, this causes signal BOUTB to be selected for output to output pin C instead of signal AOUTB by virtue of the MUX signal being low.

Meanwhile, in conjunction with signal OPA being driven low, its complementary signal /OPA is driven high. This causes switches 212-A around amplifier 202-A to close, thereby auto-zeroing the amplifier 202-A and nulling out any input referred mismatch thereof. More particularly, this causes the charge across the input capacitor (connected between the input signal pin VPAD and the ANEG input to amplifier 202-A) to be zeroed. This is beneficial because the charge across this input capacitor will incur some leakage over time as amplifier 202-A input nodes BNEG and BPOS have a non-infinite impedance to surrounding voltage sources. This also causes a constant input common as seen by each differential amplifier to be maintained. That is to say the input signal at pin VPAD is AC coupled into the ANEG and APOS nodes to keep the input common mode voltage of signals at ANEG and APOS constant across any range of levels of input common mode signal VREF1.

In operating mode 502-4, receiver paths A and B are in read operation together. In the example of FIG. 5, this includes driving signal OPA high while signal OPB remains high, and keeping the MUX signal low in this mode of operation. However, with reference to example receiver 200 shown in FIG. 2, signal BOUTB continues to be selected for output to output pin C instead of signal AOUTB by virtue of the MUX signal remaining low.

As can be seen from FIG. 5, the above sequence is repeated for the next bit from memory starting from operating mode 502-1.

As can be further seen from the example sequence in FIG. 5, the present embodiments provide continuous read functionality with no disturbances from the auto-zeroing process. This process can be further extended to accommodate more receiver paths used in parallel so as to implement unrolled decision feedback equalization (DFE) functionality. Unrolled DFE architectures are currently desirable in DDR5 standards as the Data Strobe to Data Latch timing cannot be closed without unrolling the first two DFE taps.

Figure 6:
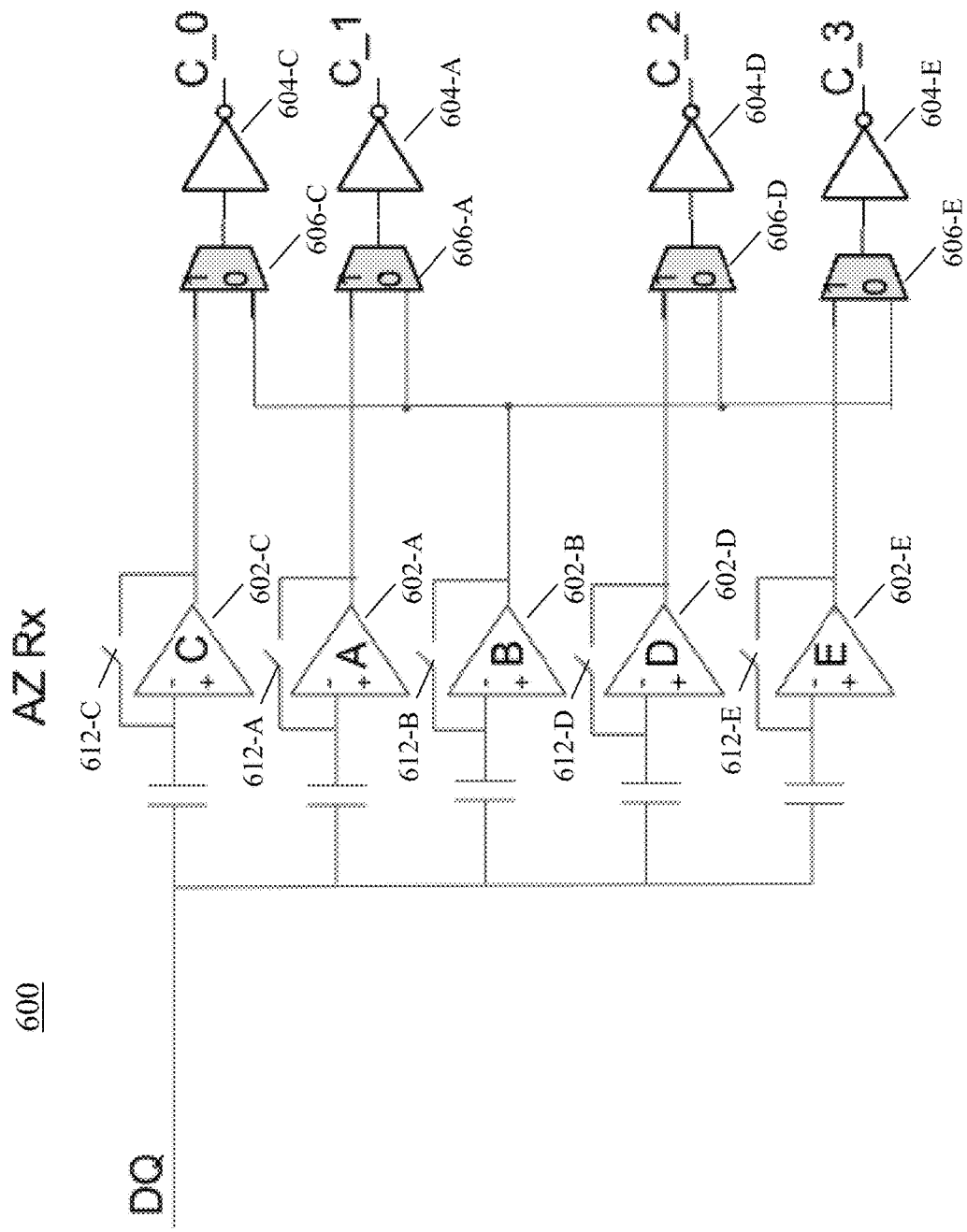
FIG. 6 is a block diagram illustrating an example receiver architecture for enabling DFE functionality according to embodiments.

FIG. 6 illustrates an example of how a two-tap unrolled DFE architecture can be implemented using the DAZR principles of the previous embodiments. In this example, the receiver 600 includes five receiver paths A, B, C, D and E in parallel, each comprising an identical differential amplifier 602 having a negative input coupled to input signal (shown as DQ in this example) via respective input capacitors. The outputs of receiver paths A, C, D and E are provided to the "1" inputs of respective multiplexers 606, while the output of receiver path B is provided to the "0" inputs of each of multiplexers 606. The outputs of multiplexers 606 are inverted by inverters 604. The final outputs of receiver paths C, A, D and E are provided as signals C_0, C_1, C_2 and C_3, respectively.

As shown, each receiver path also includes switches 612 for implementing auto-zeroing functionality as described above. It should be noted that each receiver path can also include connections and switches between the positive inputs of the differential amplifiers and reference voltages (either open loop or closed loop) as shown in FIGS. 2, 3 and 4, as well as connections to signals corresponding to the OPx and /OPx signals shown in those figures, however these are not shown in FIG. 6 for ease of illustration.

In the example shown in FIG. 6, there are four "core" receiver paths A, C, D and E, all in parallel with duplicate receiver path B. An example operational sequence of the receiver architecture 600 shown in FIG. 6 will now be described. It should be noted that all receiver paths have been auto-zeroed prior to sequence below. It should be further noted that those skilled in the art will understand how to implement this example sequence in receiver 600 after being taught by the example shown in FIG. 4.

1. Receiver paths A, C, D and E are in read operation while receiver path B is auto-zeroing. All of muxes 606 are operated to select the "1" input in this step.
2. Receiver paths A, B, C, D and E are in read operation together, and all of muxes 606 are operated to continue to select the "1" input.
3. Receiver paths B, C, D and E are in read operation while receiver A is auto-zeroing. All of muxes 606 are operated to select the "1" input in this step, except mux 606-A, which is operated to select the "0" input from receiver path B.
4. Receiver paths A, B, C, D and E are in read operation together, and all of muxes 606 are operated to select the "1" input.
5. Receiver paths A, B, D and E are in read operation while receiver C is auto-zeroing. All of muxes 606 are operated to select the "1" input in this step, except mux 606-C, which is operated to select the "0" input from receiver path B.
6. Receiver paths A, B, C, D and E are in read operation together, and all of muxes 606 are operated to select the "1" input.
7. Receiver paths A, B, C and E are in read operation while receiver D is auto-zeroing. All of muxes 606 are operated to select the "1" input in this step, except mux 606-D, which is operated to select the "0" input from receiver path B.
8. Receiver paths A, B, C, D and E are in read operation together, and all of muxes 606 are operated to select the "1" input.
9. Receiver paths A, B, C and D are in read operation while receiver E is auto-zeroing. All of muxes 606 are operated to select the "1" input in this step, except mux 606-E, which is operated to select the "0" input from receiver path B.
10. Receiver paths A, B, C, D and E are in read operation together, and all of muxes 606 are operated to select the "1" input.
11. Repeat sequence starting from Step 1

DFE functionality can be implemented using the architecture of receiver 600 as follows. For example, the outputs of receiver paths C, A, D and E will have different fixed tap weight settings based off of input signal patterns. That is, path C decodes the current incoming bit "X" if the two previous bits were "00". More particularly in this example: C decodes incoming bit X when the previous bit sequence is "00"; A decodes incoming bit X when the previous bit sequence is "01"; D decodes incoming bit X when the previous bit sequence is "10"; and E decodes incoming bit X when the previous bit sequence is "11". Note the assignment of bit sequence to path letter does not matter as long as each is a unique assignment. One purpose of DFE is to compensate for signal pattern dependent jitter. This is also known as Inter Symbol Interference (ISI).

Another example operational sequence of receiver 600, including an interleaving procedure which calibrates receiver path B after every other cycle of calibration, will now be described. It should be noted that all receivers are have been auto-zeroed prior to sequence below.

1. Receiver paths A, C, D and E are in read operation while receiver path B is auto-zeroing. All of muxes 606 are operated to select the "1" input in this step.
2. All of receiver paths A, B, C, D and E are in read operation together and all of muxes 606 are operated to continue to select the "1" input.

3. Receiver paths B, C, D and E are in read operation while receiver path A is auto-zeroing. All of muxes 606 are operated to select the "1" input in this step, except mux 606-A, which is operated to select the "0" input from receiver path B.

4. All of receiver paths A, B, C, D and E are in read operation together and all of muxes 606 are operated to continue to select the "1" input.

5. Receiver paths A, C, D and E are in read operation while receiver path B is auto-zeroing. All of muxes 606 are operated to select the "1" input in this step.

6. Receiver paths A, B, C, D and E are in read operation together and all of muxes 606 are operated to continue to select the "1" input.

7. Receiver paths A, B, D and E are in read operation while receiver path C is auto-zeroing. All of muxes 606 are operated to select the "1" input in this step, except mux 606-C, which is operated to select the "0" input from receiver path B.

8. Receiver paths A, B, C, D and E are in read operation together and all of muxes 606 are operated to continue to select the "1" input.

9. Receiver paths A, C, D and E are in read operation while receiver B is auto-zeroing. All of muxes 606 are operated to select the "1" input in this step.

10. Receiver paths A, B, C, D and E are in read operation together and all of muxes 606 are operated to continue to select the "1" input.

11. Receiver paths A, B, C and E are in read operation while receiver path D is auto-zeroing. All of muxes 606 are operated to select the "1" input in this step, except mux 606-D, which is operated to select the "0" input from receiver path B.

12. Receiver paths A, B, C, D and E are in read operation together and all of muxes 606 are operated to continue to select the "1" input.

13. Receiver paths A, C, D and E are in read operation while receiver path B is auto-zeroing. All of muxes 606 are operated to select the "1" input in this step.

14. Receiver paths A, B, C, D and E are in read operation together and all of muxes 606 are operated to continue to select the "1" input.

15. Receiver paths A, B, C and D are in read operation while receiver path E is auto-zeroing. All of muxes 606 are operated to select the "1" input in this step, except mux 606-E, which is operated to select the "0" input from receiver path B.

16. Receiver paths A, B, C, D and E are in read operation together and all of muxes 606 are operated to continue to select the "1" input.

17. Repeat sequence starting from Step 1

In additional or alternative embodiments of any of the receivers 200, 300, 400 or 600 shown in FIGS. 2, 3, 4 and 6, respectively, a capacitor based DAC can be used to inject a DC offset between the positive and negative inputs to the differential amplifiers 202 or 602 in each receiver path.

Figure 7A:
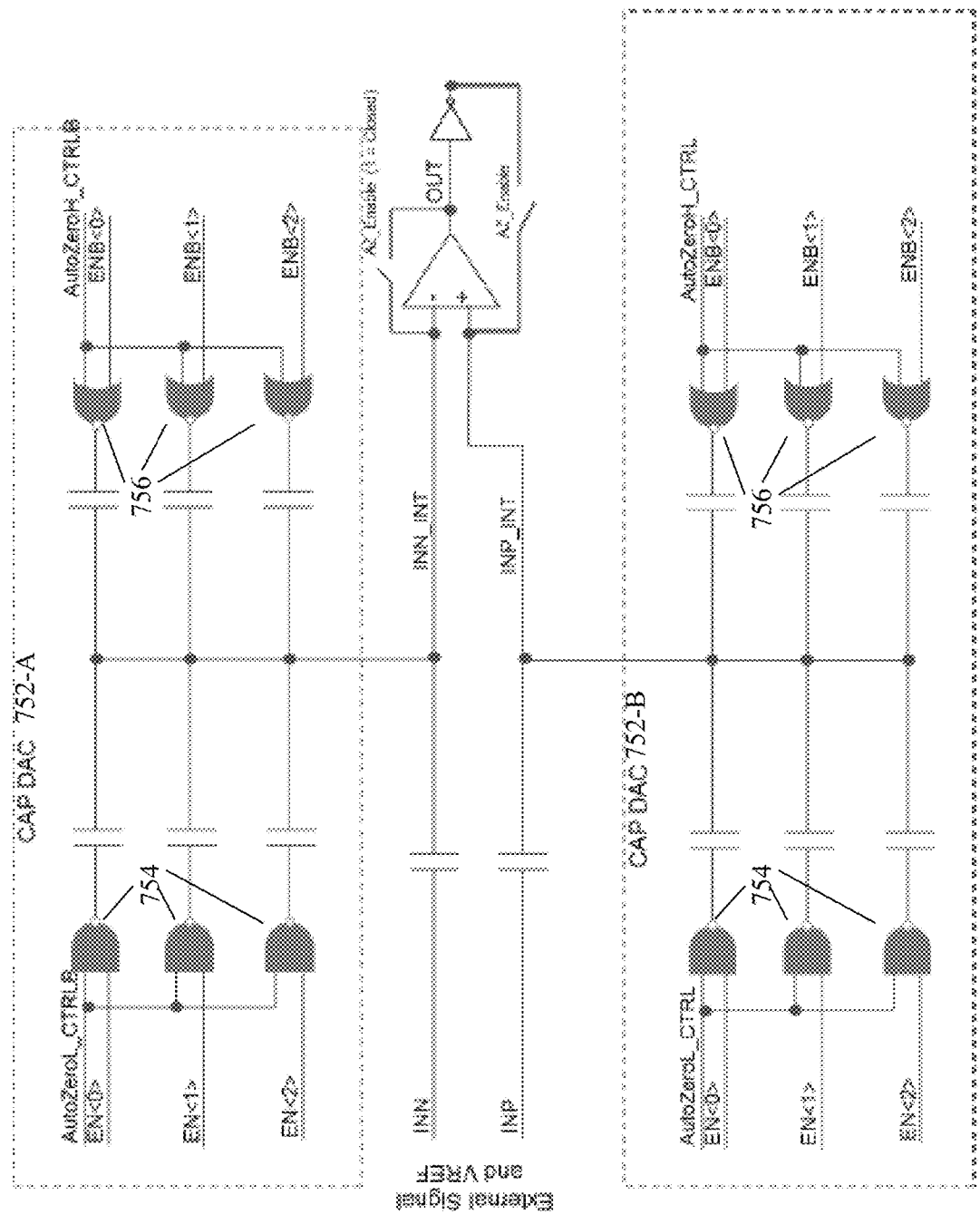
FIG. 7A is a block diagram illustrating an example receiver architecture for incorporating CAP DAC circuitry according to embodiments.

For example, as shown in FIG. 7A, a receiver path includes a differential amplifier 702 with negative and positive inputs INN_INT and INP_INT, respectively, which are further coupled to the input pins INN and INP (e.g. VPAD and VREF for a single ended input). Differential amplifier 702 further includes switches for controlling auto-zeroing as described above. The receiver path further includes CAP DAC 752-A and 752-B coupled to nodes INN_INT and INP_INT, respectively. In this example, each CAP DAC includes three NAND gates 754 whose outputs are controlled by auto-zeroing control signals and enable signals EN<2:0> and three NOR gates 756 whose outputs are controlled auto-zeroing control signals and by enable signals ENB<2:0>. More particularly, as described in more detail below, these signals can be used to appropriately time signal and balance the INP_INT as INN_INT nodes throughout all operation modes. This can allow for minimizing auto-zero calibration time as well as maintaining a constant input common mode seen at INP_INT and INN_INT nodes. The enable signal EN and its complementary signal ENB can be set to adjust the offset strength of the CAP DAC 754. Signal AutoZeroH_CTRL and similar signals are used for both setting the auto-zeroing state and to set offset polarity, as will become more apparent below.

FIG. 7B through FIG. 7E are example signal timing diagrams in connection with the CAP DAC architecture shown in FIG. 7A.

Figure 7B:
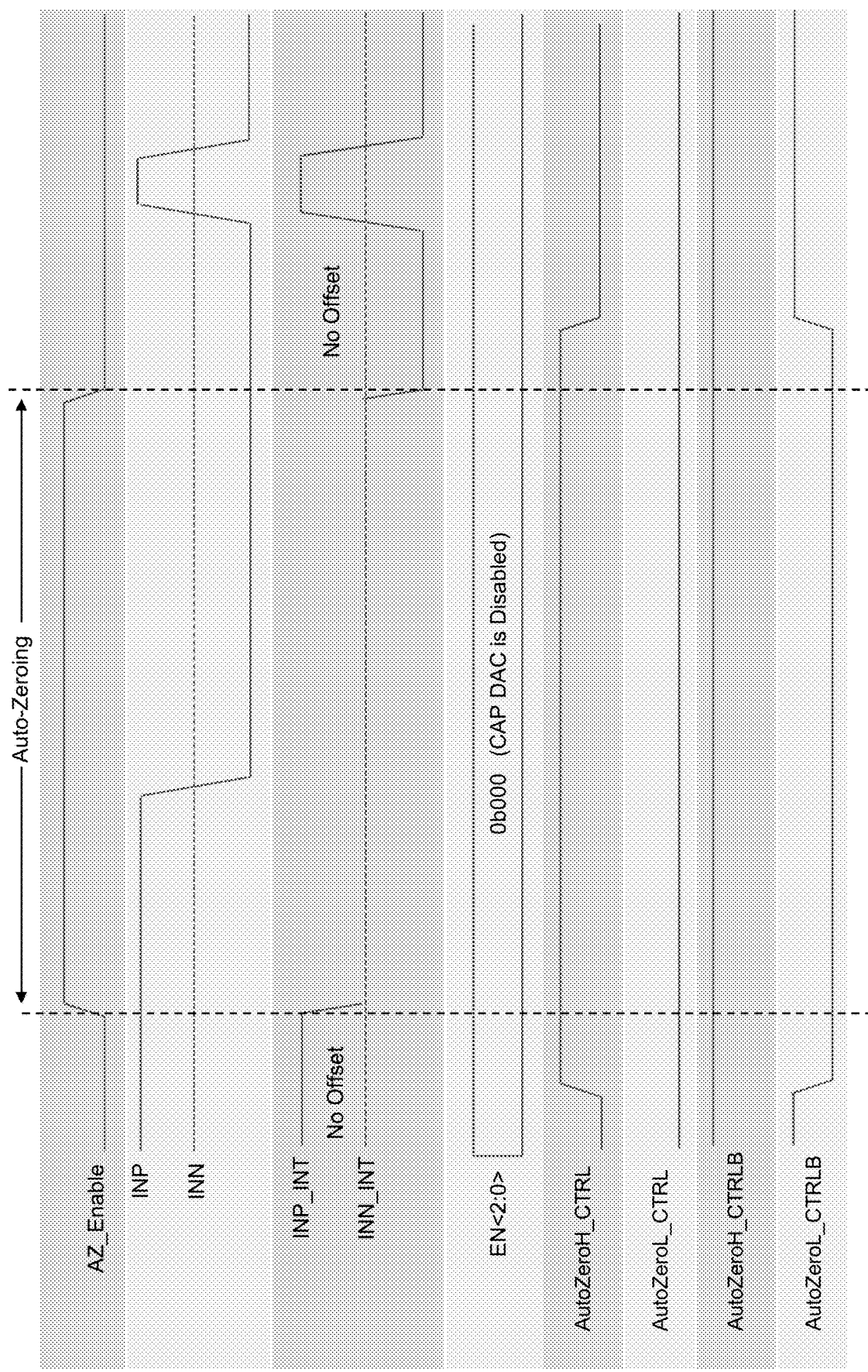
FIGS. 7B to 7E are timing diagrams illustrating example operations of a receiver architecture such as that shown in FIG. 7A.

In the example shown in FIG. 7B, the enable signals are set to configure the CAP DACs to provide no offset. Accordingly, after the auto-zeroing operation of the receiver path, no offset is added between the INN and INP signals by the CAP DACs.

Figure 7C:
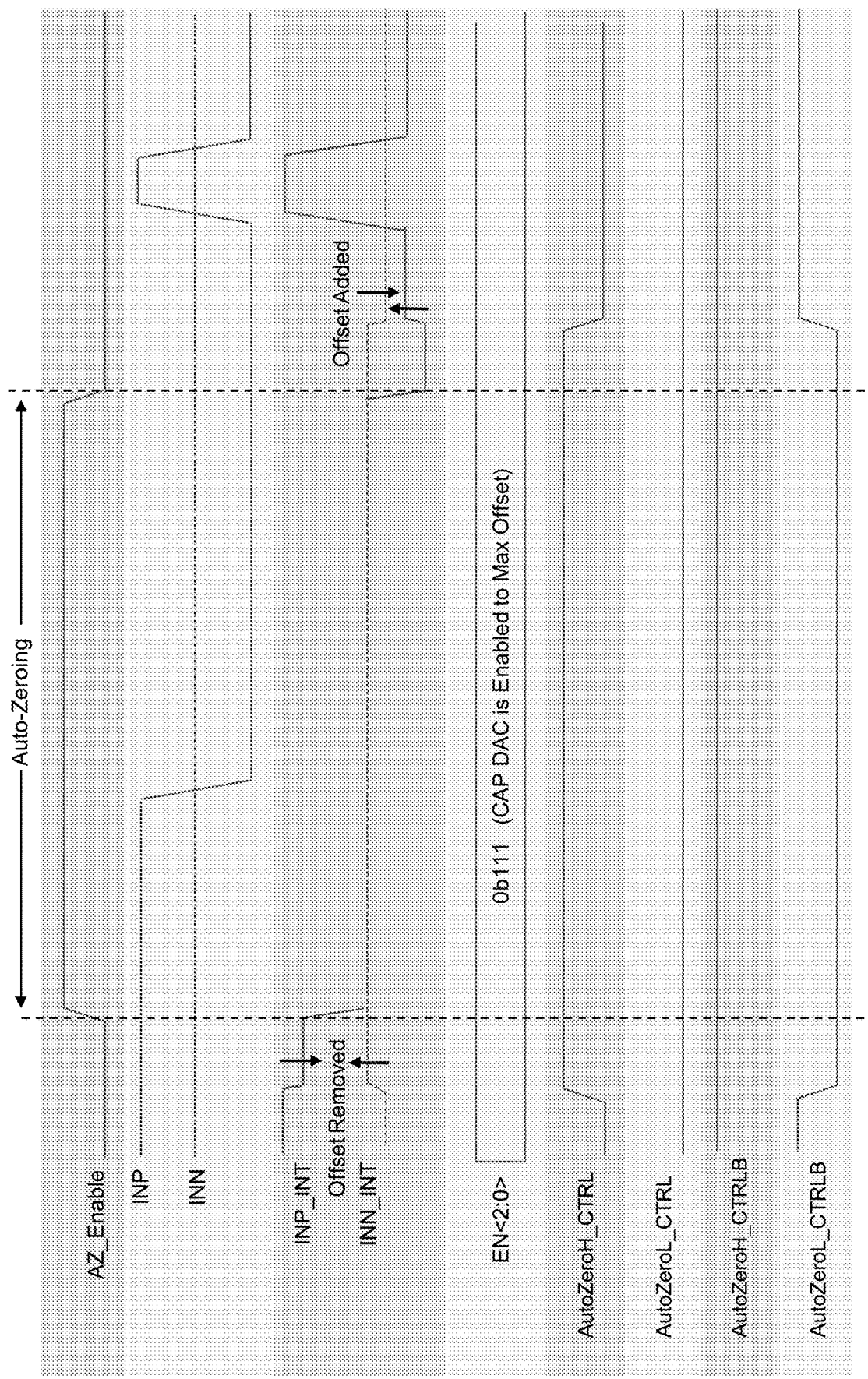

In the example shown in FIG. 7C, the enable signals are set to configure the CAP DACs to provide a maximum offset. Accordingly, before and after the auto-zeroing operation of the receive path a maximum amount of offset between signals INN and INP is removed and added, respectively, by setting of the AutoZero signals. One purpose of actively removing the offset before autozeroing is to eliminate injection of the offset signal into the autozeroing calibration.

Figure 7D:
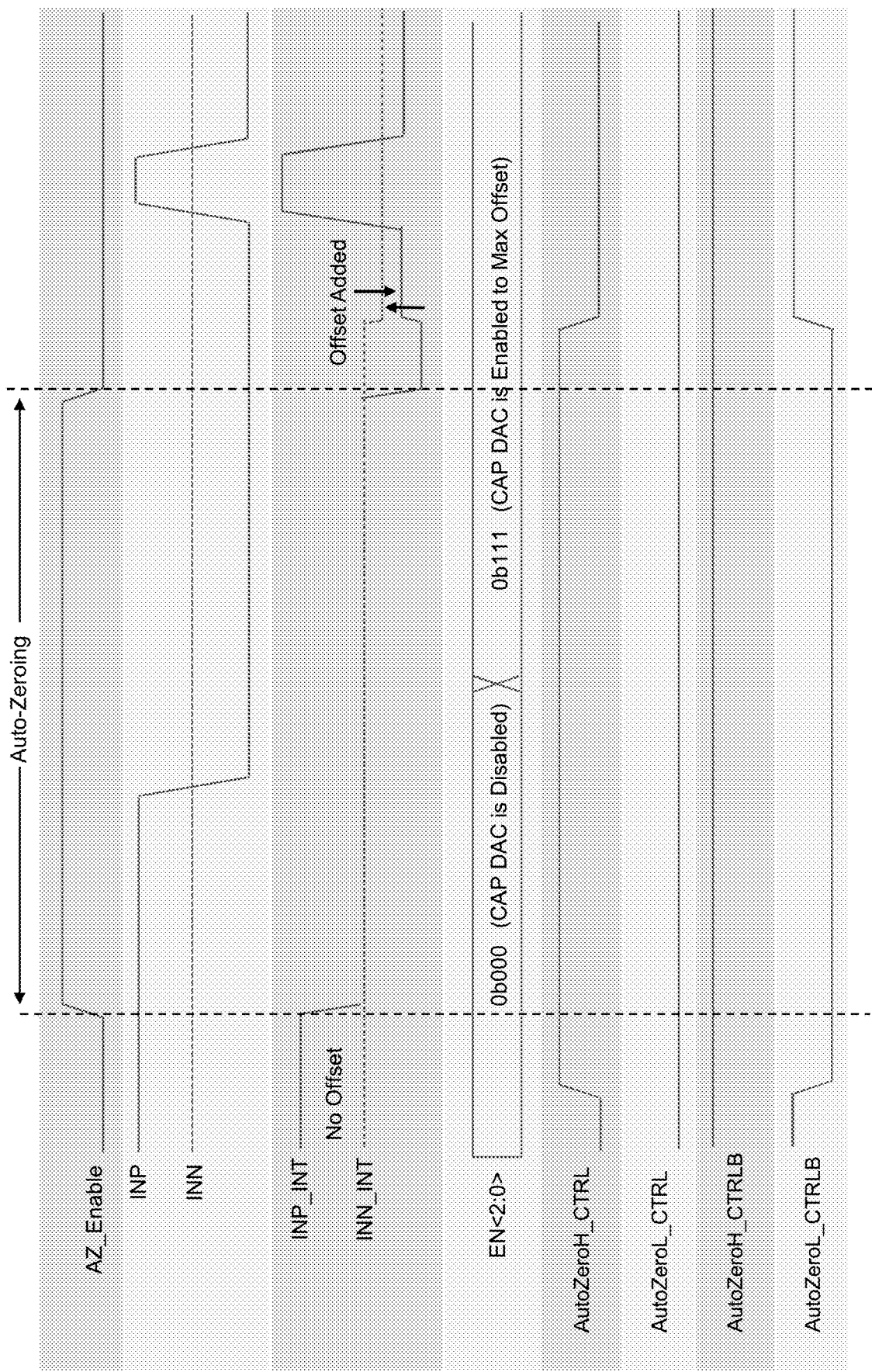
Figure 7E:
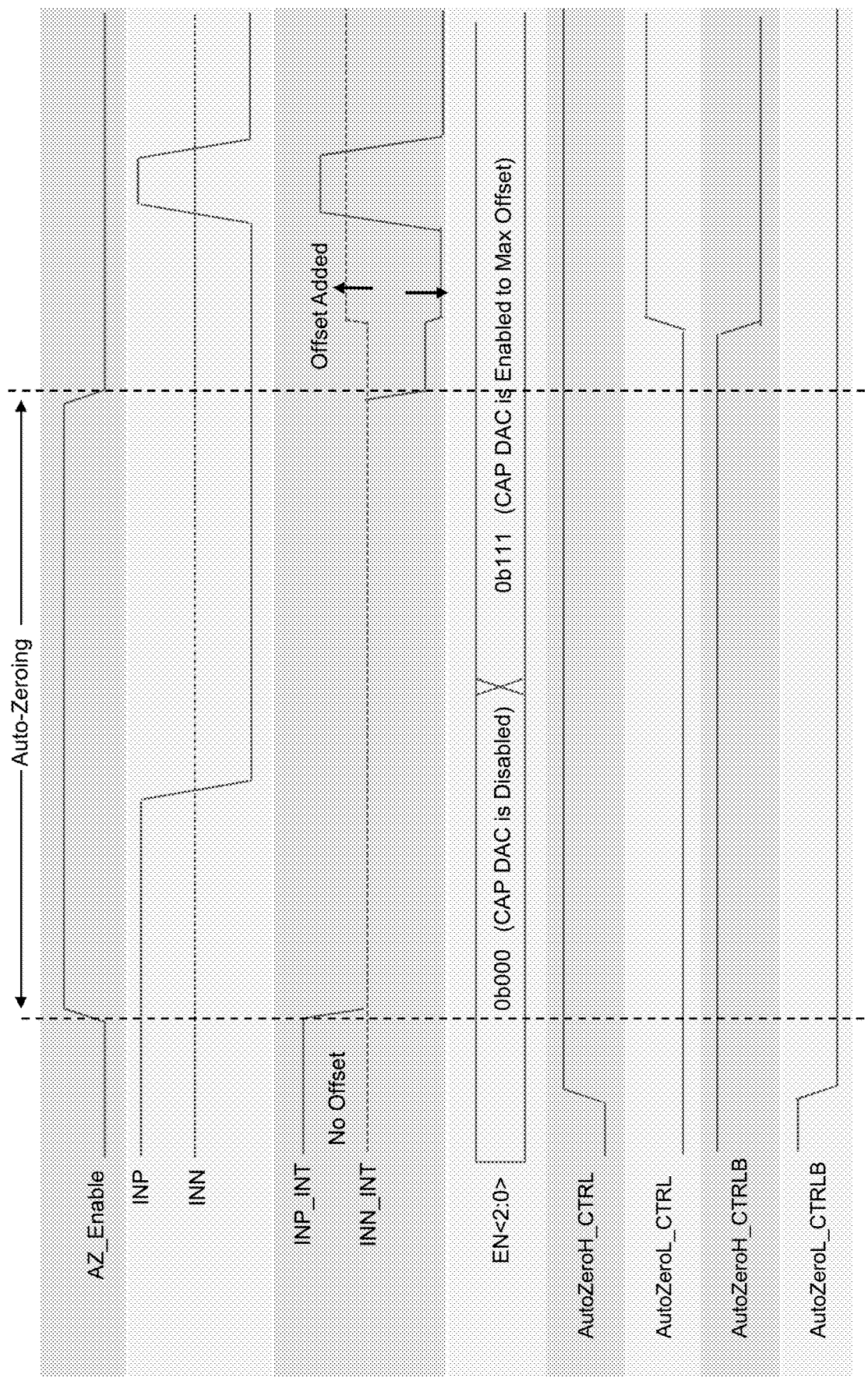

FIG. 7D illustrates an example where the enable signals are changed during the auto-zeroing operation from configuring the CAP DACs to provide no offset to configuring the CAP DACs to provide a maximum amount of offset between signals INN and INP. As further shown in the example of FIG. 7D, after the auto-zeroing operation a maximum amount of offset between signals INN and INP is added by setting of the AutoZero signals.

FIG. 7D illustrates another example where the enable signals are changed during the auto-zeroing operation from configuring the CAP DACs to provide no offset to configuring the CAP DACs to provide a maximum amount of offset between signals INN and INP. As further shown in the example of FIG. 7E, after the auto-zeroing operation a maximum amount of offset between signals INN and INP is added by another example setting of the AutoZero signals.

As should be apparent from the above, the example of FIG. 7A is a fully complementary CAP DAC architecture for providing AC coupled receiver offset in which the INN_INT and INP_INT nodes remain balanced and symmetrical. It can also be used for implementing unrolled DFE tap weight setting, dynamic feedback DFE tap weight setting, receiver DCD knob, and fast VREF adjustment for dual rank system configurations. For example, DCD can be realized by applying a non-zero bit configuration to the EN< > signal bus. This setting applies a voltage reference offset (see FIG. 7B to 7E). This offset effectively shifts the signal voltage reference as seen by the amplifiers such as 202-A and 202-B from FIG. 2. This reference offset is also useful for realizing DFE and dynamic VREF adjustment.

In additional or alternative embodiments, the DAZR architecture of the present disclosure can incorporate CTLE functionality.

Figure 8:
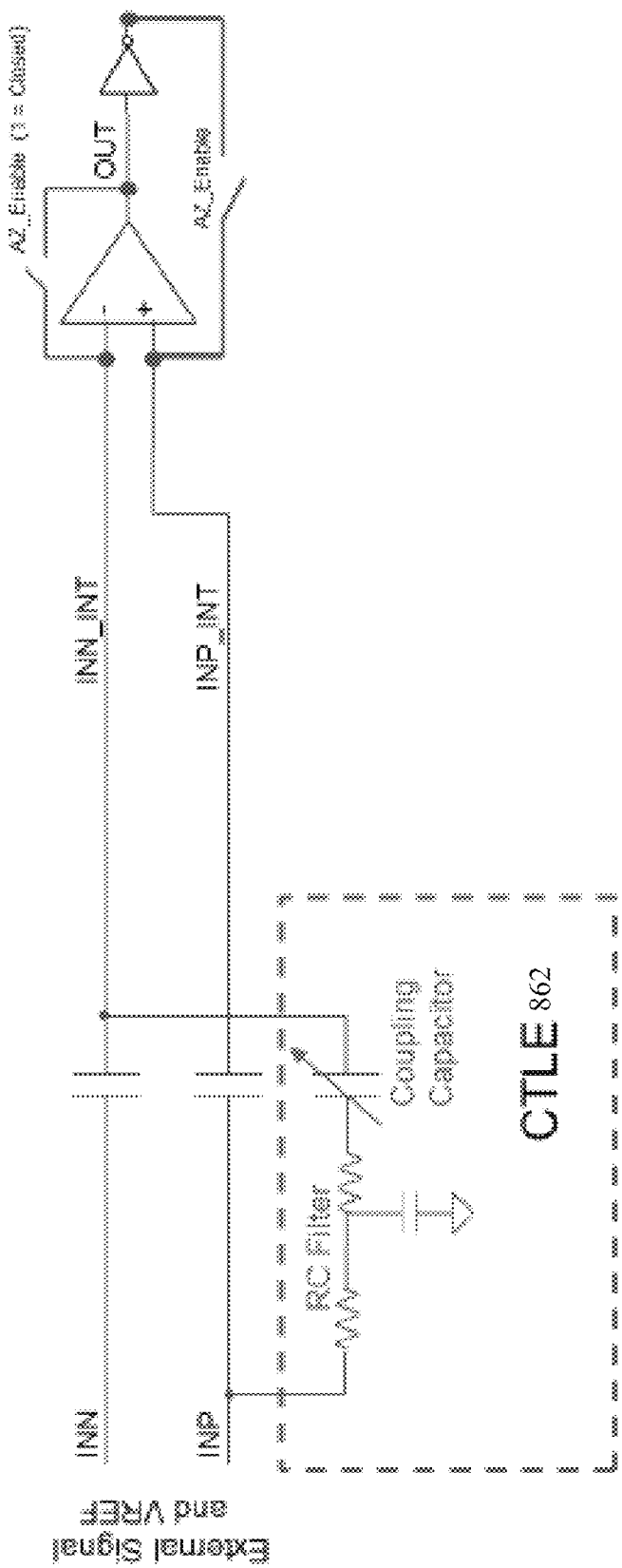
FIG. 8 is a block diagram illustrating an example receiver architecture for enabling CTLE functionality according to embodiments.

For example, as shown in the example of FIG. 8, a receiver path can include CTLE circuit 862 coupled between the signals from input pins INN and INP to the negative and positive inputs INN_INT and INP_INT of the differential amplifier, respectively. More particularly, in this example, circuit 862 includes an RC filter and adjustable coupling capacitor coupled from input pin INP to input node INN_INT. Accordingly, through AC injection of the INP node to INN_INT, a differential signal attenuation (e.g. INP_INT−INN_INT) can be achieved. The characteristics of signal attenuation can be modulated by the low-pass filter (RC filter connected to INP) and the adjustable coupling capacitor. This particular configuration incorporates auto-zeroing switches to null out any charge leakage across the CTLE coupling capacitor.

Figure 9A:
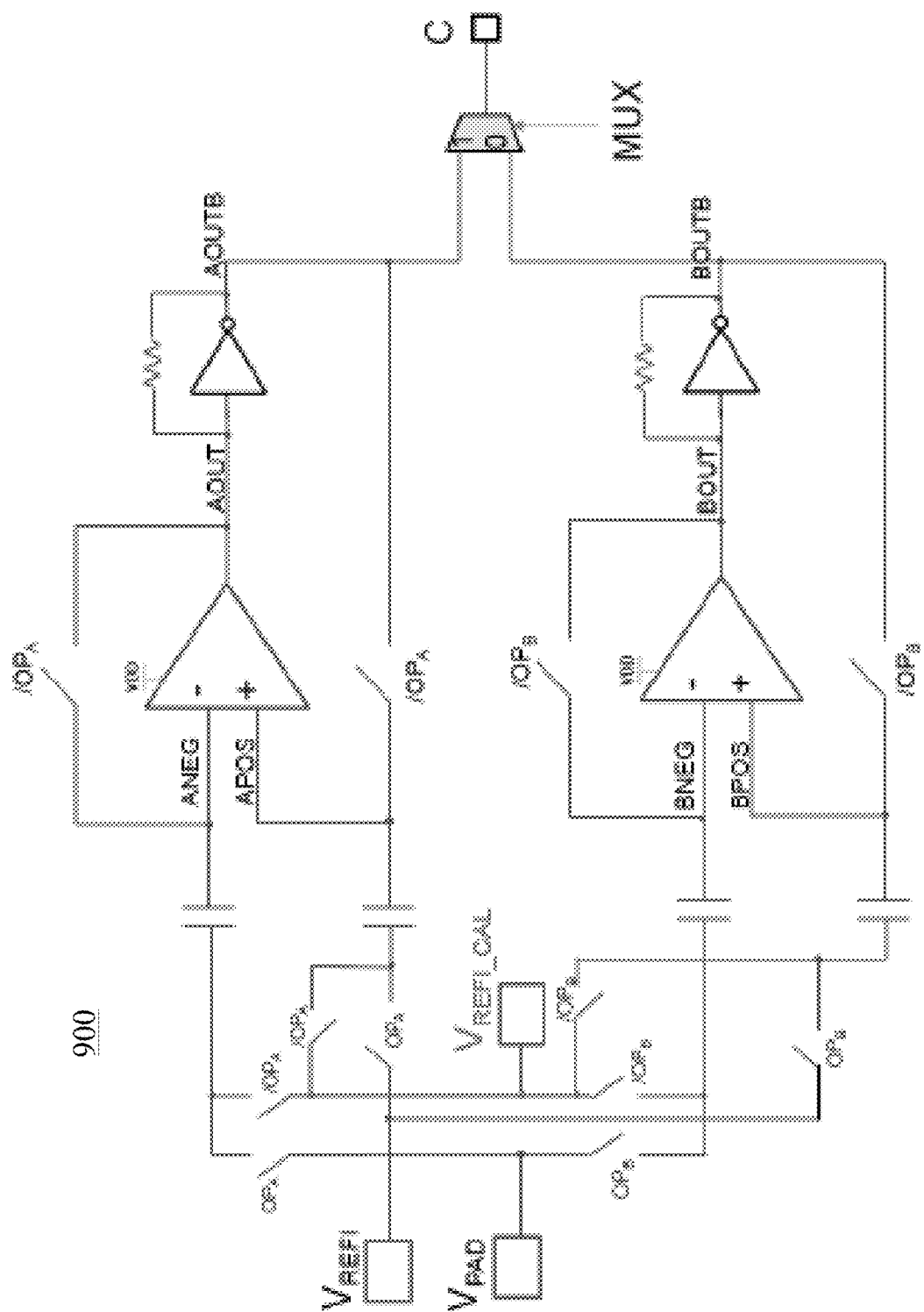
FIG. 9A is a block diagram illustrating an example single-ended input receiver that includes voltage reference generation functionality according to embodiments.
Figure 10:
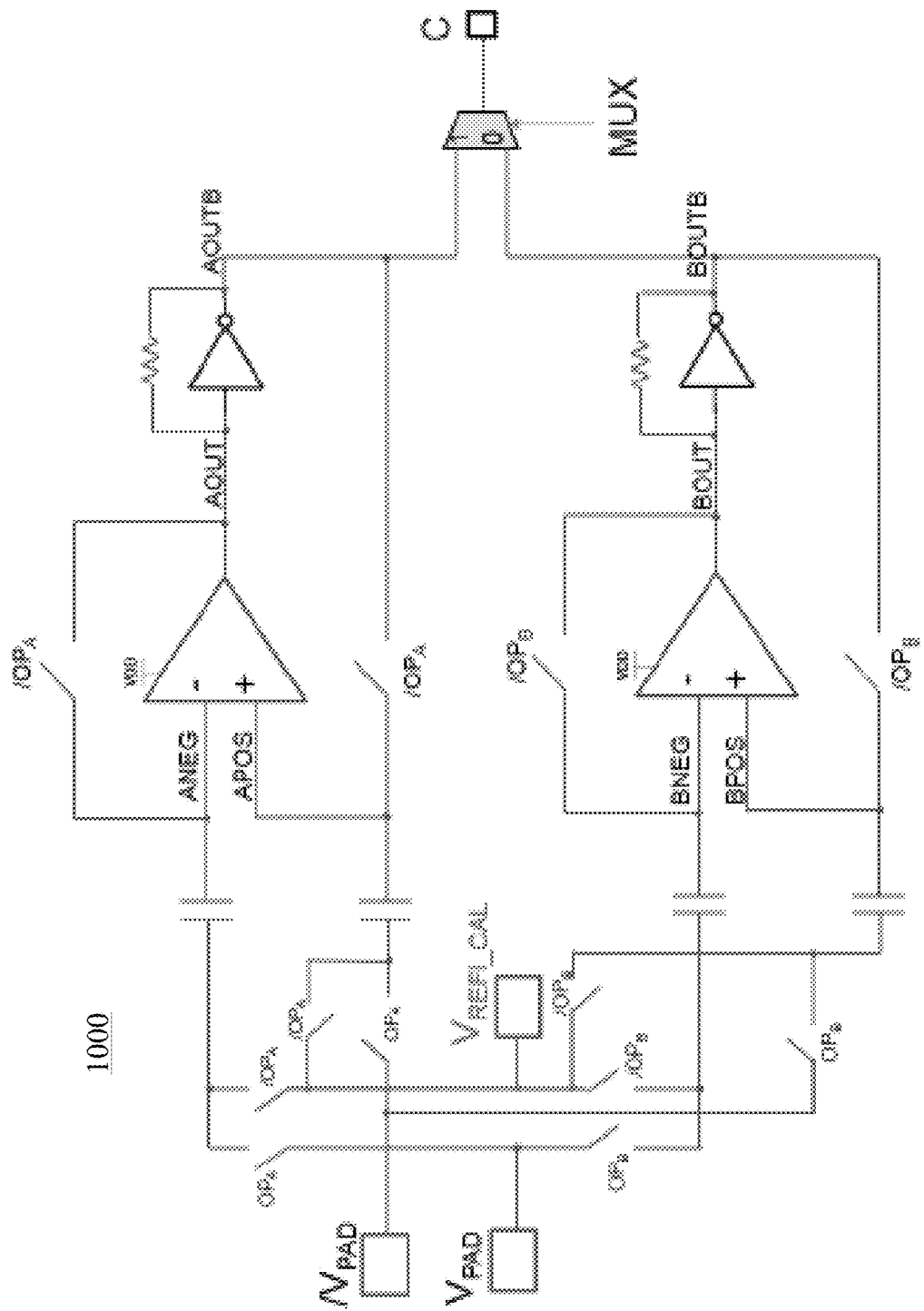
FIG. 10 is a block diagram illustrating an example differential input receiver that includes voltage reference generation functionality according to embodiments.

For high performance applications, which mandate critical timing performance, a reference voltage generation scheme can be incorporated, such as in DAZR receivers 900 and 1000 in FIGS. 9A and 10 for single ended and differential inputs, respectively. More particularly, as shown in these examples, an additional input VREF1_CAL is included.

Figure 9B:
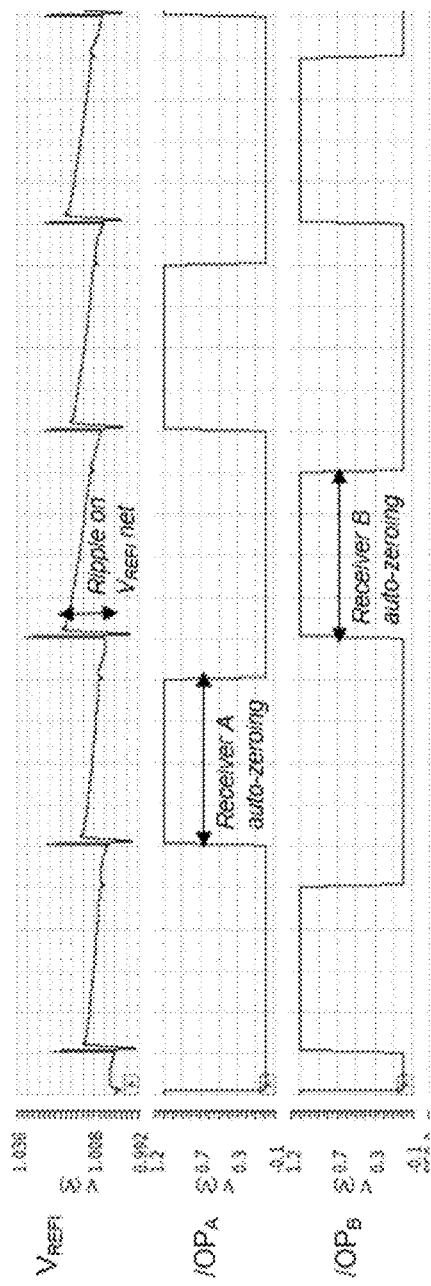
FIGS. 9B and 9C are timing diagrams illustrating example operations of a receiver such as that shown in FIG. 9A.

As further shown in the timing diagram in FIG. 9B, during the auto-zeroing phase of the receiver paths, current is sunk into a VREF generator if VPAD>VREF1 and sourced from VREF generator if VPAD<VREF1. This current creates a ripple in VREF1 signal due to the finite impedance of the VREF generator as shown in FIG. 9B. This disturbance in VREF1 signal results in timing jitter at the receiver output which is under operation. To address this problem, an additional reference voltage VREF1_CAL is generated using a separate voltage generator. A no load value of VREF1_CAL is equal to VREF1. Charging or discharging current is provided by VREF1_CAL generator instead of the VREF1 generator, thereby not disturbing the value of the VREF1 signal. A drive strength of the VREF1_CAL generator can be chosen in a way that VREF1_CAL settles to its steady value by the end of auto-zeroing phase. This is to ensure no current is sunk into or sourced from VREF1 net during read operation.

Figure 9C:
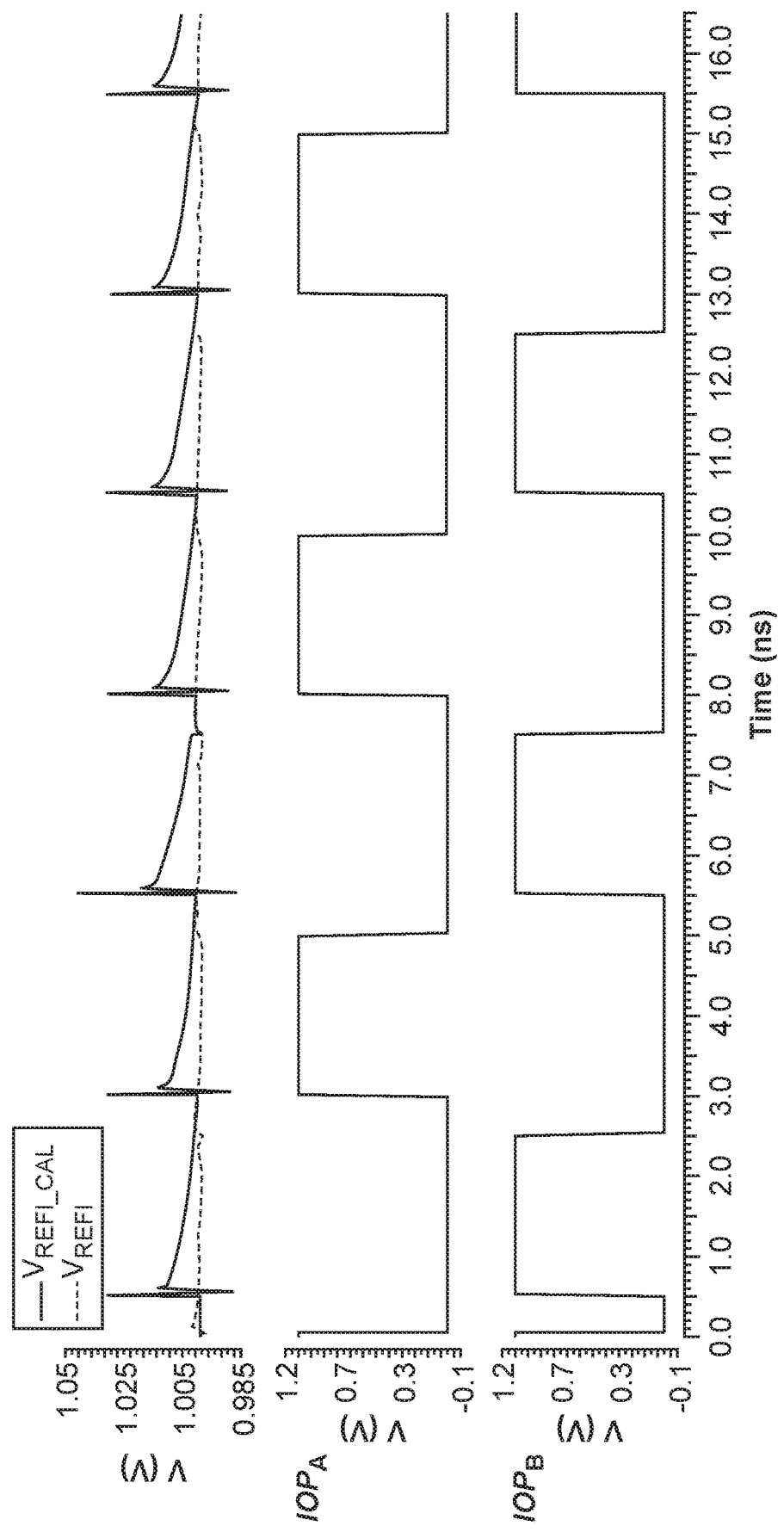

FIG. 9C shows that the ripple in VREF1 net is substantially reduced with this reference voltage generation scheme. Due to the differential nature of the receiver, performance does not degrade when both inputs change by the same magnitude. So, ripple on VREF1_CAL signal does not matter as both inputs of the receiver are referenced to VREF1_CAL in auto-zeroing phase. For the same reason, local mismatch between the two reference voltage generators (VREF1 and VREF1_CAL) does not matter as the differential input to the receiver is VREF1−VPAD (APOS=VREF1−VREF1_CAL, ANEG=VPAD−VREF1_CAL and differential input APOS-ANEG=VREF1−VPAD). With this dual reference voltage generation scheme, timing jitter at the receiver output is reduced.

Figure 11:
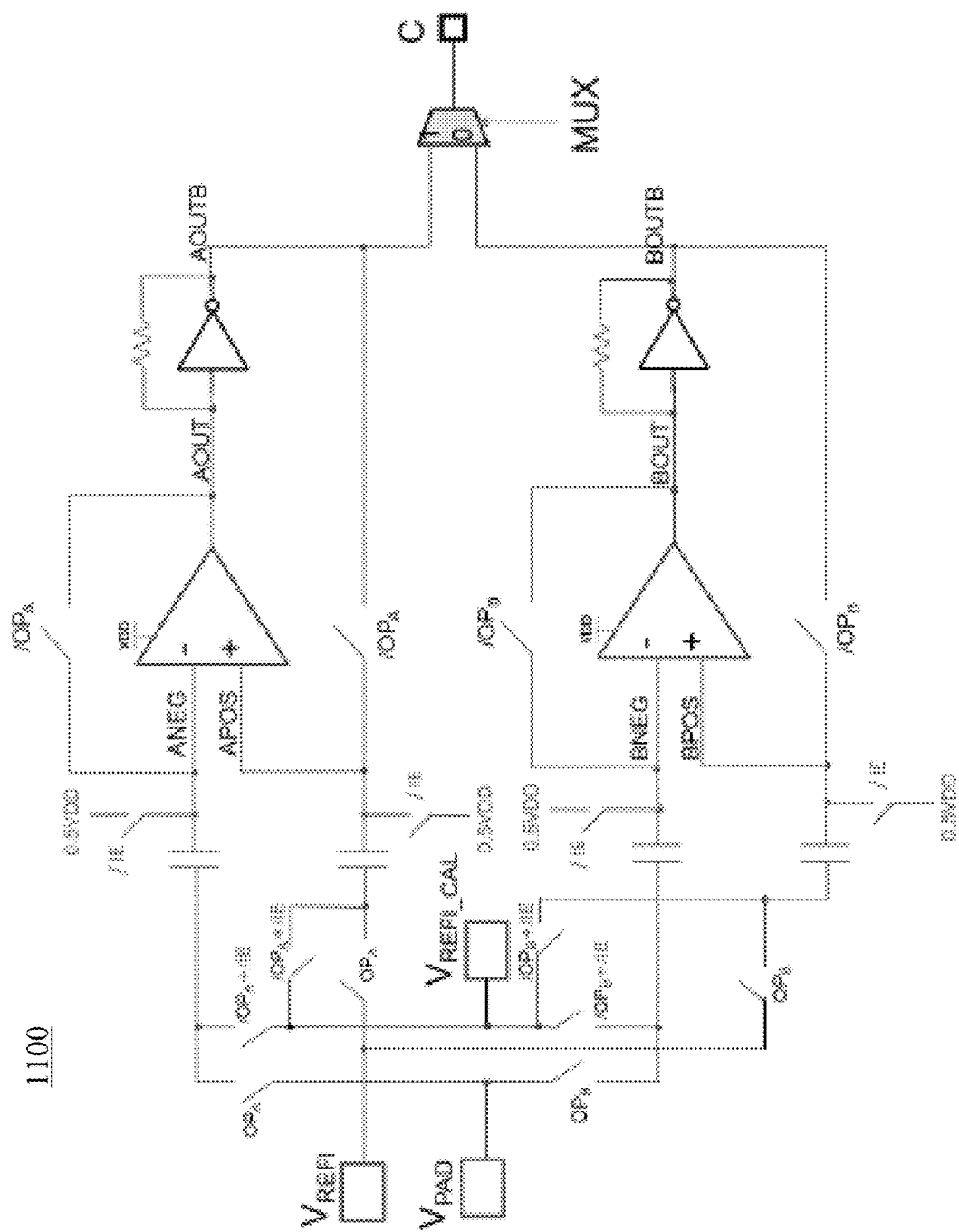
FIG. 11 is a block diagram illustrating another example receiver that includes voltage reference generation functionality according to embodiments.

In yet additional or alternative embodiments, internal nets of the DAZR receiver can be pre-charged to support faster receiver enable time as shown in FIG. 11. When the receiver 1100 is enabled (/IE=0), auto-zeroing is performed simultaneously for all receivers before data is read. In a case of a receiver configuration which supports DFE with two unrolled taps, five receivers are to be auto-zeroed simultaneously. In such a scenario, VREF block would see a higher load at VREF1_CAL net which increases the settling time of VREF1_CAL. This increases the time delay required between receiver enable signal going high and the start of read operation thereby impacting the overall system bandwidth (in a case where VREF1_CAL signal does not settle to its steady state value before the start of read operation, current will be either sunk into or sourced from VREF1 net thereby increasing the timing jitter at receiver output). To solve this problem, when the receiver is disabled, one end of the coupling capacitor is pre-charged to VREF1_CAL value and the other end is pre-charged to 0.5 VDD which is close to the DC operating point after auto-zeroing.

It should be noted that the DAZR receiver architecture of the present embodiments is not necessarily exclusive of the use of other receiver architectures in addition to, or alternatively to, the DAZR receiver architecture. For example, a receiver can include both a DAZR receiver and a conventional DC coupled receiver, and can be configured with a low speed bypass mode where the DAZR receiver is bypassed, and a lower performance DC coupled signal amplifier is used instead.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A receiver for a memory interface device comprising:
    first and second differential amplifiers, each having a first input coupled to receive a signal from a memory associated with a data and a second input coupled to a reference; and
    a multiplexer having first and second inputs coupled to outputs of the first and second differential amplifiers, respectively, and an output coupled to an output pin,
    wherein during a single read operation of the data from memory, the multiplexer is configured to sequentially first select for output to the output pin one of the outputs of the first and second differential amplifiers followed by second selecting for output to the output pin the other one of the outputs of the first and second differential amplifiers.

2. The receiver of claim 1, wherein the signal is a differential signal from the memory and the reference is a complementary signal corresponding to the differential signal.

3. The receiver of claim 1, wherein during the single read operation and when one of the first and second differential amplifiers is selected, the other of the first and second differential amplifiers is configured to be auto-zeroed.

4. The receiver of claim 1, wherein each of the first and second differential amplifiers includes a first closed loop path for shorting the output to the first input.

5. The receiver of claim 4, wherein each of the first and second differential amplifiers includes a second closed loop path for shorting an inverted version of the output to the second input.

6. The receiver of claim 1, further comprising:
    a coupling capacitor between the first input of each of the first and second differential amplifiers; and
    pre-charging circuitry coupled to both ends of the coupling capacitor.

7. The receiver of claim 6, wherein the pre-charging circuitry is configured to be activated when the receiver is disabled for read operations.

8. The receiver of claim 1, further comprising:
    offset generation circuitry coupled to one or both of the first and second inputs of each of the first and second differential amplifiers, wherein the offset generation circuitry is configured to incur an input signal offset relative to the reference.

9. The receiver of claim 8, wherein the offset generation circuitry comprises a plurality of selectable capacitors.

10. The receiver of claim 9, wherein a number of the plurality of selectable capacitors can be adjusted to provide a desired positive or negative signal offset relative to the reference.

11. The receiver of claim 1, further comprising:
continuous time linear equalization (CTLE) circuitry coupled to the first and second inputs of each of the first and second differential amplifiers.

12. The receiver of claim 11, wherein the CTLE circuitry incorporates a low pass filter resulting in low frequency input signal attenuation.

13. The receiver of claim 1, further comprising:
a DC coupled signal amplifier; and
circuitry to bypass the first and second differential amplifiers.

14. The receiver of claim 1, wherein the receiver can be configured to operate as one of a two tap unrolled receiver, a one tap unrolled receiver or a receiver with no unrolled taps based on a desired power consumption level.

15. The receiver of claim 1, wherein a dedicated reference voltage is generated and used for the reference.

16. A method for receiving data in a memory interface device comprising:
configuring first and second differential amplifiers to each have a first input coupled to receive a signal from memory associated with a data and a second input coupled to a reference; and
during a single read operation of the data from memory, sequentially first selecting for output to an output pin one of the outputs of the first and second differential amplifiers followed by second selecting for output to the output pin the other one of the outputs of the first and second differential amplifiers.

17. The method of claim 16, further comprising, during the single read operation and when one of the first and second differential amplifiers is selected, configuring the other of the first and second differential amplifiers to be auto-zeroed.

18. The method of claim 16, wherein a coupling capacitor is coupled between the first input of each of the first and second differential amplifier, the method further comprising:
pre-charging one or both ends of the coupling capacitor.

19. The method of claim 16, further comprising:
causing an input signal offset relative to the reference.

20. The method of claim 16, further comprising performing continuous time linear equalization (CTLE) on the first and second inputs of each of the first and second differential amplifiers.

* * * * *